United States Patent
Eelbode

(10) Patent No.: US 9,333,536 B2
(45) Date of Patent: *May 10, 2016

(54) TRANSDUCER ASSEMBLY FOR AN ECHOSCOPE

(71) Applicant: TELEFLEX MEDICAL EUROPE LTD., Athlone (IE)

(72) Inventor: Nico Eelbode, Oostende (BE)

(73) Assignee: TELEFLEX MEDICAL EUROPE LTD., Athlone (IE)

( * ) Notice: Subject to any disclaimer, the term of this patent is extended or adjusted under 35 U.S.C. 154(b) by 0 days.

This patent is subject to a terminal disclaimer.

(21) Appl. No.: 14/322,846

(22) Filed: Jul. 2, 2014

(65) Prior Publication Data

US 2014/0313860 A1     Oct. 23, 2014

Related U.S. Application Data

(63) Continuation of application No. 13/976,564, filed as application No. PCT/IB2012/000876 on May 4, 2012, now Pat. No. 8,773,953.

(30) Foreign Application Priority Data

May 16, 2011    (BE) ............................ BE-2011/0294

(51) Int. Cl.
 B06B 1/06      (2006.01)
 G01S 15/89     (2006.01)
(52) U.S. Cl.
 CPC ........... B06B 1/0607 (2013.01); G01S 15/8925 (2013.01)

(58) Field of Classification Search
 CPC ........................ B06B 1/0607; G01S 15/8925
 See application file for complete search history.

(56) References Cited

U.S. PATENT DOCUMENTS

| | | | |
|---|---|---|---|
| 3,888,238 A | 6/1975 | Meindl et al. | |
| 4,373,533 A | 2/1983 | Iinuma | |
| 5,855,558 A | 1/1999 | Nakao et al. | |
| 5,891,039 A | 4/1999 | Bonnefous et al. | |
| 6,036,661 A | 3/2000 | Schwarze et al. | |
| 6,261,234 B1 | 7/2001 | Lin | |
| 8,773,953 B2 * | 7/2014 | Eelbode | 367/140 |
| 2010/0041996 A1 * | 2/2010 | Nygaard et al. | 600/459 |
| 2013/0294198 A1 * | 11/2013 | Eelbode | 367/87 |
| 2014/0228685 A1 * | 8/2014 | Eelbode | 600/439 |
| 2014/0313860 A1 * | 10/2014 | Eelbode | 367/140 |

FOREIGN PATENT DOCUMENTS

| | | | |
|---|---|---|---|
| WO | 03000137 A1 | 1/2003 | |
| WO | 03065896 A2 | 8/2003 | |
| WO | 2012156793 A1 | 11/2012 | |

* cited by examiner

*Primary Examiner* — Daniel Pihulic

(74) *Attorney, Agent, or Firm* — Baker & Hostetler LLP

(57) ABSTRACT

A transducer assembly is disclosed. The transducer assembly includes a first transducer element comprising a first row of ultrasonic transducers and a second transducer element comprising a second row of ultrasonic transducers. The first row of ultrasonic transducers can be arranged at a nonzero angle with respect to the second row of ultrasonic transducers. The first transducer element and the second transducer element can be detachably connected. A connector can be in electrical communication with the first transducer element and the second transducer element, where the connector is configured to be connected to an endoscope.

20 Claims, 4 Drawing Sheets

TRANSDUCER ASSEMBLY FOR AN ECHOSCOPE

CROSS-REFERENCE TO RELATED APPLICATIONS

This application is a continuation of U.S. patent application Ser. No. 13/976,564, filed Jun. 27, 2013, which claims priority to International Patent App. No. PCT/IB2012/000876, filed May 4, 2012, which claims the foreign priority of Belgium Patent App. No. BE-2011/0294, filed May 16, 2011, the disclosures of which are incorporated by reference in their entirety.

FIELD OF THE INVENTION

The present invention relates to a transducer assembly for an echoscope, comprising a first row of ultrasonic transducers and a second row of ultrasonic transducers.

BACKGROUND

A transducer consists of a piezo crystal which can generate an ultrasonic sound wave by means of an electrical voltage and can, conversely, transform such an ultrasonic sound wave into a voltage. In medical echography, transducers are incorporated in a transducer element in one or more rows in order to transmit ultrasonic sound waves into the body of a human or an animal and receiving the reflection of these rays in order to be able to compose an image of the inside of said human or said animal.

To this end, such a transducer element is coupled to an echoscope by means of a connector, which echoscope ensures that the sound waves to be transmitted are generated by the transducers and which receives the measured values of the reflection via the transducer element and processes these to form images which can be interpreted by the user (usually medically qualified staff).

By means of an echoscope and a suitable transducer element, it is then possible, for example, to image a blood vessel into which a needle has to be inserted.

At present, there are various types of transducer elements on the market, each of which is suitable for specific applications.

In a linear transducer element, transducers are arranged in a row. By means of such a linear transducer element, sound waves are transmitted into the tissue parallel to one another and the echoscope generates a rectangular image by measuring the reflection. In this case, the image width and the line density remain constant at every tissue depth. Such a transducer element results in a high resolution close to the transducers. A transducer element of this type is, for example, ideal for use in diagnosing soft tissue. However, curved skin surfaces quickly cause cast shadows which impede correct imaging.

A sector transducer element produces a conical image which is very narrow close to the transducer element and becomes wider at increasing tissue depth. With such a transducer element, ribs, for example, do not produce disruptive cast shadows, so that this type of transducer element is often used in cardiology and abdominal. The frequency of these transducers is low in order to be able to carry out deep scans, but a lower frequency also lowers the resolution. In this case, however, the structures in the vicinity are not imaged well and the line density decreases with the tissue depth.

A convex transducer element is a compromise between such a linear transducer element and a sector transducer element.

However, the drawback of such transducer elements with a single row of transducers is that, for example, a needle which has to be imaged with these, either has to be axially imaged or in the longitudinal direction. Using an axial view produces the best overview, but results in such a needle only being shown as a dot on the screen. In the longitudinal direction, on the other hand, it is more difficult to gain a good overview of the surrounding structures, but such a needle can be imaged in its entirety. If this needle is to be introduced into a blood vessel, it is not entirely certain that the needle is positioned in the centre of the blood vessel if only one plane is used.

In order to overcome these and similar problems, various types of transducer elements have also already been developed which comprise various rows of transducers.

Such transducer elements have already been described, for example, in WO 03/065896 A2, U.S. Pat. No. 6,261,234 B1, U.S. Pat. No. 3,888,238 A, U.S. Pat. No. 5,891,039 A and U.S. Pat. No. 4,373,533 A.

By means of a transducer element comprising several rows of transducers, it is, for example, possible to image a needle simultaneously in both said directions, so that a correct positioning thereof is greatly simplified.

However, such transducer elements are not practical for scanning, for example, small cavities (for example subclavia), whereas a small linear transducer element would be advantageous.

On the other hand, long linear transducers are often used to gain a better overview of the surrounding structures.

As transducer elements are the most expensive parts of echoscopes, it will be rare, in practice, to have all the possible uses of these transducer elements available. Therefore, a choice is often made for certain transducer elements and only one or a few transducer elements are bought, the advantages of which correspond most closely to the most frequent application.

SUMMARY OF THE INVENTION

It is now an object of the present invention to provide a transducer assembly by means of which the advantages of the various types of transducer elements can be combined, so that it is possible to have the various desired advantages available without having to purchase a plurality of expensive specific transducer elements for this purpose.

This object of the invention is achieved by providing a transducer assembly for an echoscope, comprising a first row of ultrasonic transducers and a second row of ultrasonic transducers, wherein the first row of ultrasonic transducers forms part of a first transducer element, wherein the second row of ultrasonic transducers forms part of a second transducer element and wherein the first transducer element and the second transducer element are detachably connectable to one another in at least two positions to form a composite transducer element.

By means of such a transducer assembly according to the invention, it is possible to use both the first transducer element and the second transducer element separately, resulting in the known advantages of such transducer elements with a single row of transducers. The two transducer elements can also be assembled in different positions in order to produce other types of transducers together. Thus, it is, for example, possible for both to be assembled in a first position to form a relatively long transducer element with a relatively long row of transducers, or for them to be assembled in a second position to form a transducer element comprising several rows, such as for example transducer elements such as those in WO 03/065896 A2, U.S. Pat. No. 6,261,234 B1, U.S. Pat. No. 3,888,238 A, U.S. Pat. No. 5,891,039 A or U.S. Pat. No. 4,373,533 A.

With regard to software, it can easily be ensured that the imaging is adjustable to the various possible positions, so that the imaging can in each case be adjusted to the specific composite transducer element and the use thereof at a certain moment.

In a preferred embodiment of such a transducer assembly, the first transducer element and the second transducer element are detachably connectable in a first position, wherein the first row of ultrasonic transducers is arranged essentially in line with the second row of ultrasonic transducers, and in a second position, wherein the first row of ultrasonic transducers is arranged at an angle with respect to the second row of ultrasonic transducers.

By means of such a transducer assembly, it is therefore also possible to use either one of both transducer elements separately with a single row of transducers, either a composite transducer element with a single row of transducers, wherein both transducer elements are assembled to form a relatively long row of transducers, or a composite transducer element with several rows of transducers, wherein both transducer elements are assembled with their rows of transducers at an angle with respect to one another.

Still more preferably, said angle is essentially perpendicular.

In a specific embodiment of such a transducer assembly, the first row of ultrasonic transducers and the second row of ultrasonic transducers are arranged in a T shape in the second position.

This then makes it possible, for example, to produce a composite transducer element which is described in U.S. Pat. No. 6,261,234 B1 or in WO 03/065896 A2 or in U.S. Pat. No. 4,373,533 A with all the advantages this entails.

In a particular embodiment of a transducer assembly according to the present invention, the first row of ultrasonic transducers is adapted in order to transmit first ultrasonic rays into a body in a first direction and to receive the reflection of said first ultrasonic rays, the second row of ultrasonic transducers is adapted to transmit second ultrasonic rays into a body in a second direction and to receive the reflection of said second ultrasonic rays, and said first direction and said second direction intersect with one another in at least one of said positions.

By means of such a transducer assembly, it is, for example, possible to produce a composite transducer element which corresponds to a transducer element as described in U.S. Pat. No. 4,373,533 A, with all the advantages this entails.

The first row of ultrasonic transducers of a more particular embodiment of a transducer assembly according to the present invention is virtually as long as the second row of ultrasonic transducers.

A further particular transducer assembly according to the present invention comprises at least a third row of ultrasonic transducers which forms part of a third transducer element which is detachably connectable in at least one position to the first and/or to the second transducer element.

In this case, the third transducer element is preferably detachably connectable to the first and/or to the second transducer element in at least two positions.

In this case, the first transducer element, the second transducer element and the third transducer element are preferably detachably connectable in a first position, wherein the first row of ultrasonic transducers, the second row of ultrasonic transducers and the third row of ultrasonic transducers are arranged virtually in line with each other, in a second position, wherein the first row of ultrasonic transducers, the second row of ultrasonic transducers and the third row of ultrasonic transducers are arranged virtually in a T shape, and in a third position, wherein the first row of ultrasonic transducers, the second row of ultrasonic transducers and the third row of ultrasonic transducers are arranged virtually in an H shape.

This then makes it possible, for example, to produce a composite transducer element as described in U.S. Pat. No. 5,891,039 A or in U.S. Pat. No. 3,888,238 A, with all the advantages this entails.

In an even more particular embodiment of a transducer assembly according to the present invention, at least one of said rows of ultrasonic transducers is of the convex type.

In a simple embodiment of a transducer assembly according to the present invention, said transducer elements are connectable to one another in order to detachably connect said transducer elements. Instead of making the transducer elements directly connectable (to one another), they may, as an alternative, for example be detachably connected to one another by means of a holder element for holding the various transducer elements.

Said transducer elements of a transducer assembly according to the invention preferably comprise connecting means for detachably connecting said transducer elements.

More specifically, said transducer elements are detachably connectable to one another by means of a sliding connection.

Preferably, the first transducer element then comprises first sliding elements as connecting means which are arranged on an end side of the first transducer element and the second transducer element comprises second sliding elements as connecting means which are arranged on a longitudinal side and on an end side of the second transducer element, so that the first transducer element, in the first position, are connectable to the sliding elements on the end side of the second transducer element by a sliding connection using the sliding elements on its said end side and, in the second position, are connectable to the sliding elements on the longitudinal side of the second transducer element by a sliding connection using the sliding elements on its said end side.

More particularly, the sliding connection may be achieved by sliding the first sliding elements across the second sliding elements.

Said transducer elements can furthermore preferably be detachably connected to one another by means of a click-fit connection.

By combining a sliding connection with such a click-fit connection, it is readily possible to ensure that the transducer elements are positioned very accurately with respect to one another in the various possible positions. The sliding movement then ensures that the various transducer elements are oriented correctly with respect to one another, while the click-fit connection ensures that the transducer elements can then be (temporarily) fixed in the correct position with respect to one another.

If said transducer elements are connectable by means of a sliding connection and a click-fit connection, the first sliding elements are preferably provided with first click-fit means, the second sliding elements are preferably provided with second click-fit means and the click-fit connection is preferably achieved by click-fitting the first click-fit means and the second click-fit means.

In this case, the click-fit connection is preferably achieved at the end of said sliding movement.

Said transducer elements furthermore preferably comprise positioning elements for positioning the transducer elements in the various positions with respect to one another.

If the transducer elements are provided with click-fit means, these click-fit means may, as has been described above, been designed in such a manner that they also serve as positioning elements.

In a very particular embodiment of a transducer assembly according to the present invention, said transducer elements are detachably connectable to one another by means of a flexible connection, so that they can be flexibly displaced with respect to one another in the connected position. By means of such a flexible connection, it can always be ensured as much as possible that the various rows of transducers of the various transducer elements always adjoin the skin of a human or an animal to be inspected, so that cast shadows are prevented as much as possible.

If the two transducer elements intersect, one structure in the centre of the image will be imaged simultaneously at two angles. This is known as the so-called compounding effect. This effect has the advantage, for example, that less anisotropy occurs, inter alia when imaging a tendon structure. Anisotropy typically occurs in tendons whose fibres reflect the sound waves at different angles which are consequently not received by the transducers, resulting in a black image thereof.

The object of the present invention is also achieved by providing an echoscope which comprises an above-described transducer assembly according to the present invention.

The present invention will now be explained in more detail with reference to the following detailed description of some preferred embodiments of transducer assemblies according to the present invention. The sole intention of this description is to give illustrative examples and to indicate further advantages and features of the invention and can therefore by no means be interpreted as a limitation of the area of application of the invention or of the patent rights defined in the claims.

BRIEF DESCRIPTION OF THE DRAWINGS

In this detailed description, reference numerals are used to refer to the attached drawings, in which.

DETAILED DESCRIPTION

Figure 1:
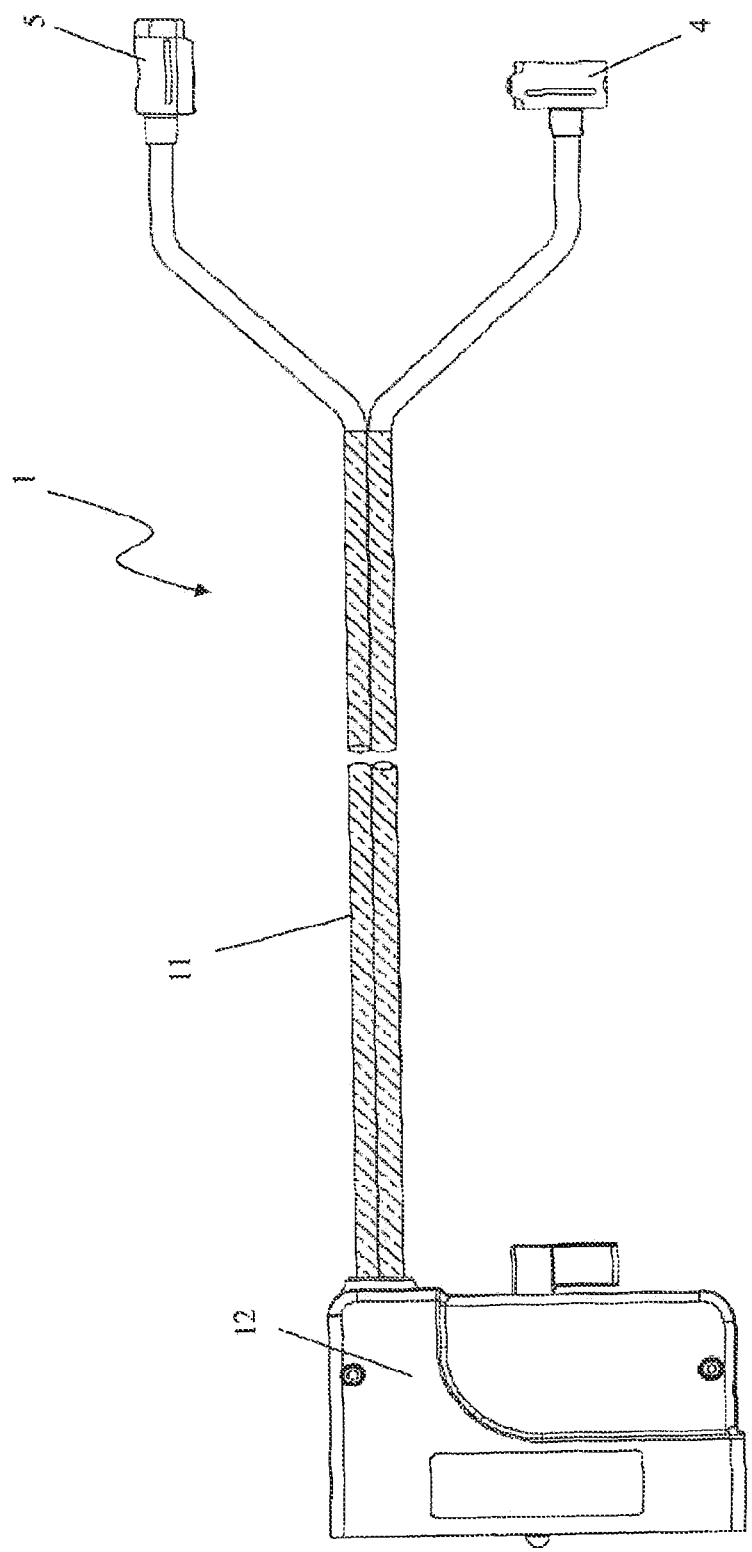
FIG. 1 shows an embodiment of a transducer assembly according to the present invention in side view.
Figure 5:
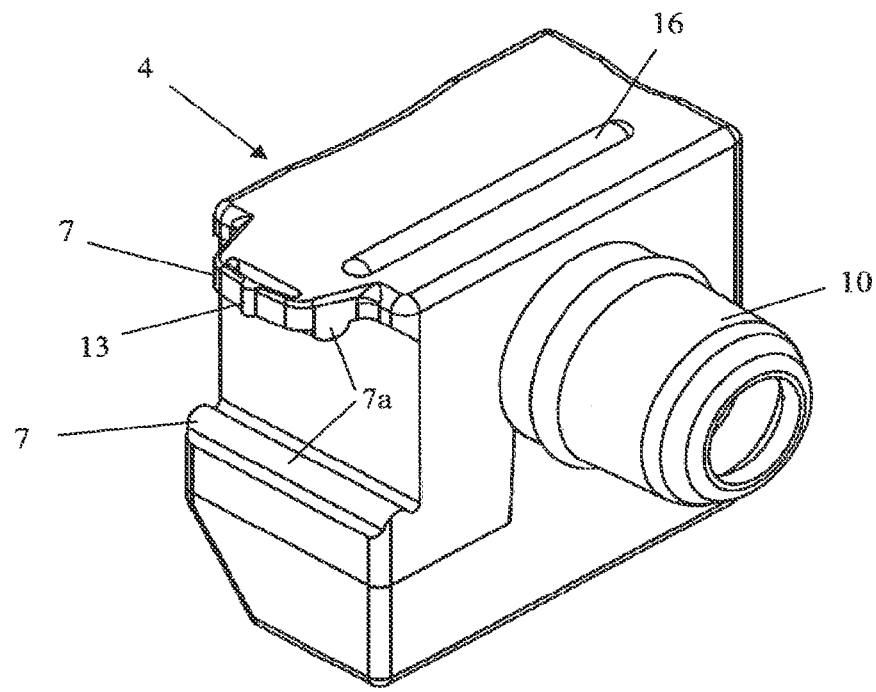
FIG. 5 shows the first transducer element of the transducer assembly from FIG. 1 in perspective, with its sliding elements directed to the front.
Figure 6:
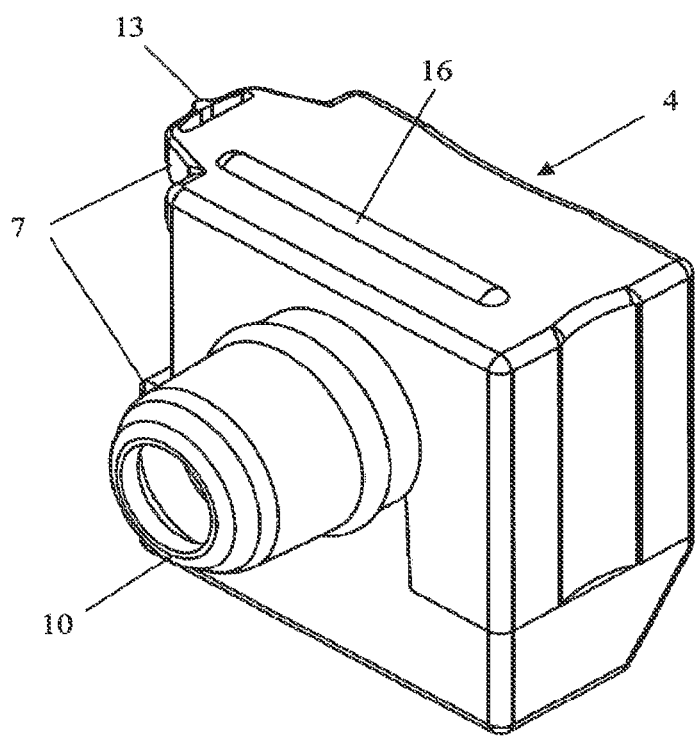
FIG. 6 shows the first transducer element of the transducer assembly from FIG. 1 in perspective, with its sliding elements directed to the rear.
Figure 7:
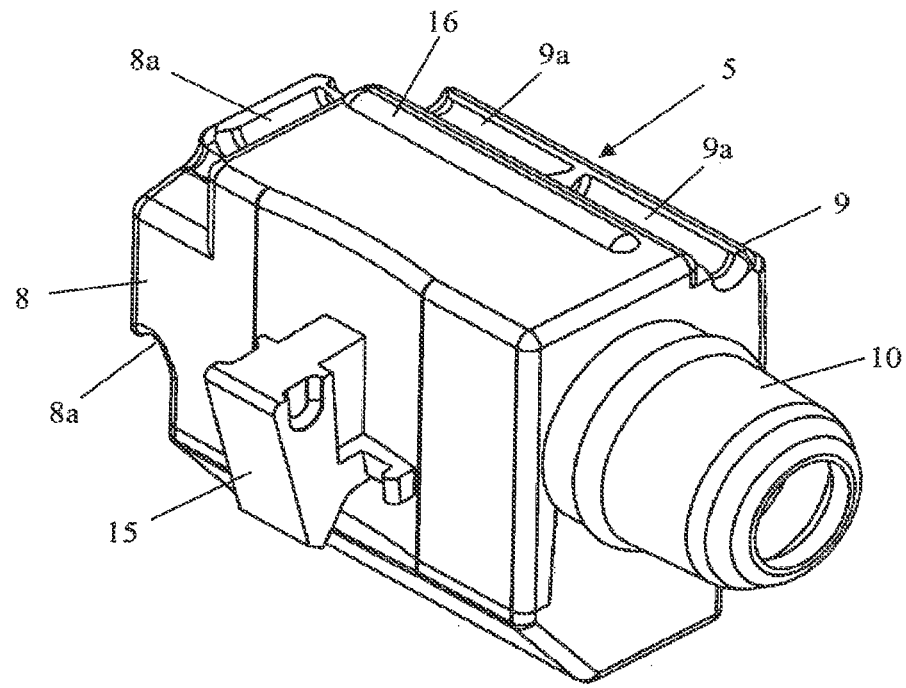
FIG. 7 shows the second transducer element of the transducer assembly from FIG. 1 in perspective, with its sliding elements directed to the rear.
Figure 8:
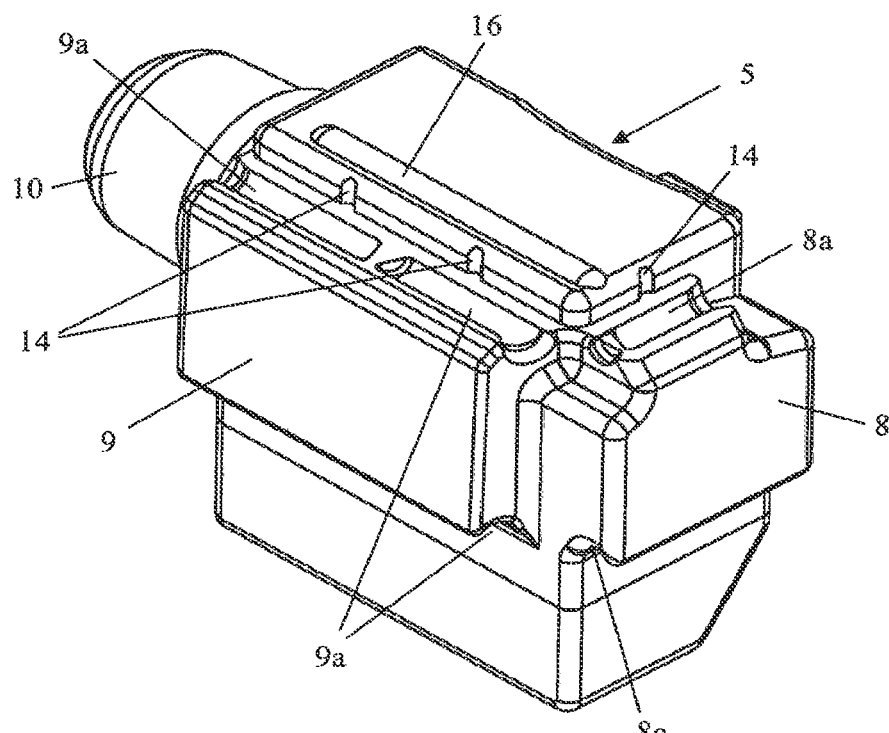
FIG. 8 shows the second transducer element of the transducer assembly from FIG. 1 in perspective, with its sliding elements directed to the front.

The embodiment of a transducer assembly (1) according to the invention as illustrated in the figures comprises, as can clearly be seen in FIG. 1, a first transducer element (4) which is illustrated separately in FIGS. 5 and 6 and a second transducer element (5) which is illustrated separately in FIGS. 7 and 8. Other embodiments of transducer assemblies (1) according to the invention which have not been illustrated may also comprise several (for example three) transducer elements (4, 5).

Both transducer elements (4, 5) of the illustrated embodiment are of the linear type. Depending on the desired applications, a transducer assembly according to the invention may, for example, also comprise one or more transducer elements of the convex type.

Figure 4:
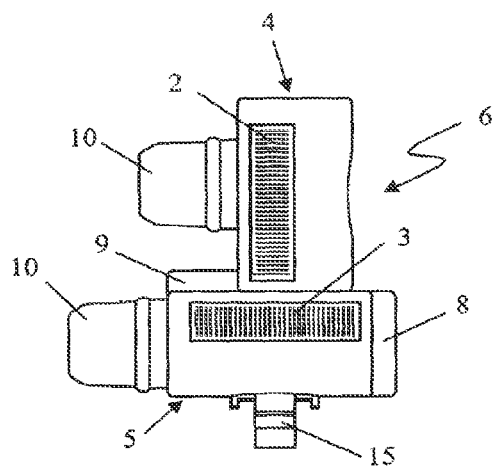
FIG. 4 shows the composite transducer element from FIG. 2 in bottom view.

Each illustrated transducer element (4, 5) comprises a row of transducers (2, 3) which are directed to the bottom side of the respective transducer element (4, 5), as can be seen in FIG. 4. In this specific embodiment, each transducer element (4, 5) comprises 64 transducers. The nominal frequency of both transducer elements (4, 5) is 7.5 Mhz. Of course, depending on the applications, transducer elements with more or fewer transducers and/or with a different nominal frequency, etc. may also be provided in a transducer assembly (1) according to the invention.

In the illustrated embodiment, the rows of ultrasonic transducers (2, 3) are adapted for transmitting ultrasonic rays into a body in a direction perpendicular to the bottom surface of the transducer elements (4, 5) and for receiving the reflection of these rays. Alternatively, the first row of transducers (2) of the first transducer element (4) could also be adapted to transmit rays in a different direction than the second row of transducers (3) of the second transducer element (5) and/or vice versa.

As can be seen in FIG. 1, both transducer elements (4, 5)—analogously to the known transducer elements—are connected to a connector (12) by means of cables (11) so that this transducer assembly (1) are connectable to an echoscope.

By means of suitable software, it can be ensured that each transducer element (4, 5) can be used as a linear transducer element in the known manner, wherein associated imaging is generated by the echoscope.

Both transducer elements (4, 5) can also be connected to one another so as to be mutually detachable to form a composite transducer element (6).

By assembling the transducer elements (4, 5) in a first position (not shown), in which the rows of transducers (2, 3) are arranged in line with one another, a relatively long composite linear transducer element (4, 5) is produced, by means of which, for example, a larger overview of the surrounding structure in a body can be obtained.

Figure 2:
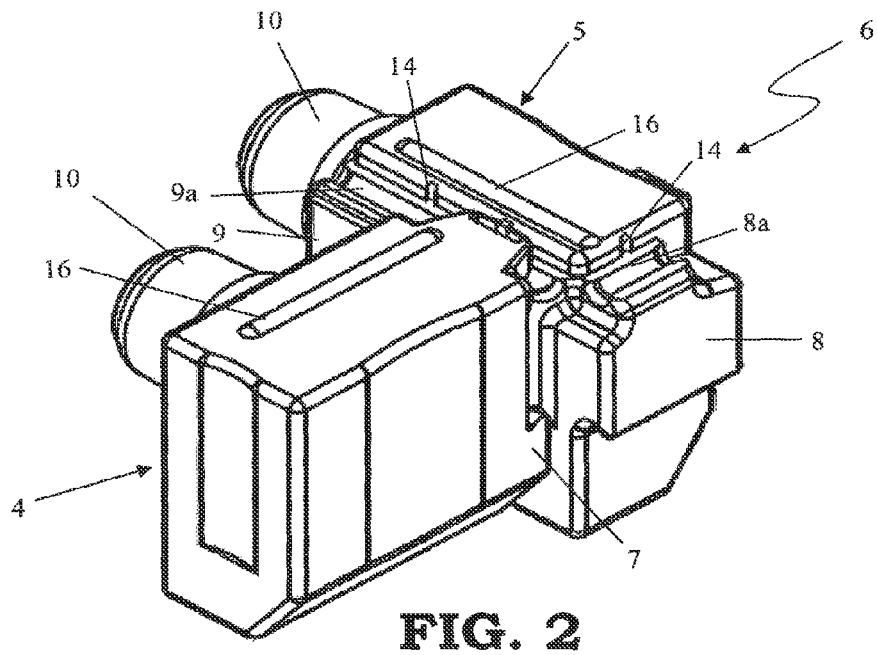
FIG. 2 shows a composite transducer element in perspective, comprising a first transducer element and a second transducer element of the transducer assembly from FIG. 1, which are connected to one another in a second position.
Figure 3:
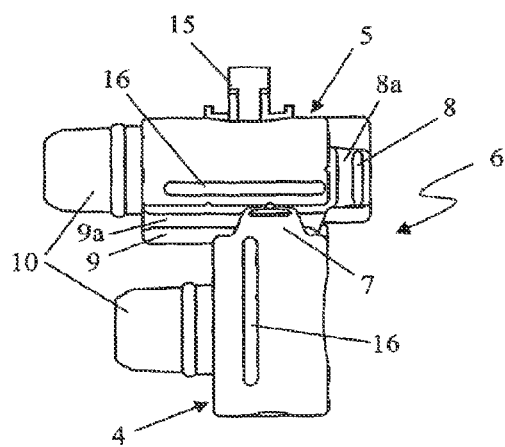
FIG. 3 shows the composite transducer element from FIG. 2 in top view.

By assembling the transducer elements (4, 5) in a second position which can be seen in FIGS. 2-4, in which the rows of transducers (2, 3) extend perpendicular to one another in a T shape, a composite transducer element (6) with two perpendicular rows of transducers (2, 3) is produced, by means of which, for example, different planes of a body can be imaged together simultaneously.

In order to be able to assemble the transducer elements (4, 5) to form a composite transducer element (6), the first transducer element (4) is provided with first sliding elements (7), while the second transducer element (5) is provided with second sliding elements (8, 9), wherein the first sliding elements (7) can be slid across the second sliding elements (8, 9) in order to produce a sliding connection. To this end, the first sliding elements (7) may be provided with ribs (7*a*) which can be pushed into slots (8*a*, 9*a*) of the second sliding elements (8, 9). The first sliding elements (7) are provided on the end side of the first transducer element (4), as can clearly be seen in FIG. 5. As can clearly be seen in FIG. 8, the second transducer element (5) is provided, on the one hand, with second sliding elements (8) on an end side, and, on the other hand, with second sliding elements (9) on a longitudinal side. In this way, the first transducer element (4) are connectable in the first position (not shown) to the sliding elements (8) on the end side of the second transducer element (5) by a sliding connection using the sliding elements (7) on its end side. The first transducer element (4) can also be connected in the second position (as illustrated in FIGS. 2-4) to the sliding elements (8) on the longitudinal side of the second transducer element (5) by a sliding connection using the sliding elements (7) on its end side.

In order to then be able to fix the transducer elements (4, 5) in a detachable manner in a correct preset position with respect to one another in assemblies, the transducer elements (4, 5) are furthermore also provided with click-fit means (13, 14) which also serve as positioning elements (13, 14). To this end, the first transducer element (4) is provided with a rib (13) which can be fitted in cavities (14) of the second transducer element (5). In order to be able to achieve the click-fit connection, the first transducer element (4) is provided with a cavity behind said rib (13), so that said rib (13) is elastically displaceable.

Alternatively, these transducer elements (4, 5) could, for example, also be connected to one another by detachably attaching them to a holding element which is adapted for this purpose.

On their top side, the illustrated transducer elements (4, 5) are in each case provided with reference lines (16) which indicate, on the top side of the transducer elements (4, 5), the position of the row of transducers (2, 3) on the bottom side of these transducer elements (4, 5).

Obviously, a transducer assembly (1) according to the invention can furthermore be provided with all kinds of auxiliary means which, for example, are also already known from the prior art. Thus, as can clearly be seen in FIG. 7, a transducer assembly (1) may be provided with a guiding element (15) for guiding, for example, a puncture needle. In addition, a transducer assembly (1) may, for example, also be provided with a Doppler meter. Furthermore, it may be provided with, for example, a securing strip for securing the transducer elements (4, 5) on a body in order thus to be able to insert a needle hands-free, with one or more holder elements for simply holding these transducer elements (4, 5), with sterile sleeves and securing aids therefor, etc.

What is claimed is:

1. A transducer assembly, comprising:
a first transducer element comprising a first row of ultrasonic transducers; and
a second transducer element comprising a second row of ultrasonic transducers, wherein:
the first transducer element and the second transducer element are detachably connected, and
the first row of ultrasonic transducers is arranged at a nonzero angle with respect to the second row of ultrasonic transducers.

2. The transducer assembly of claim 1, wherein the first transducer element is adjacent to the second transducer element.

3. The transducer assembly of claim 1, wherein the first transducer element is slidable relative to the second transducer element.

4. The transducer assembly of claim 3, wherein:
the first transducer element comprises first sliding elements arranged on an end side of the first transducer element, and
the second transducer element comprises second sliding elements arranged on a longitudinal side of the second transducer element and third sliding elements arranged on an end side of the second transducer element.

5. The transducer assembly of claim 1, wherein the first transducer element and the second transducer element are detachably connected by a click-fit connection.

6. The transducer assembly of claim 1, wherein the first transducer element and the second transducer element are detachably connected by a flexible connection, such that the first transducer element and the second transducer element are configured to be flexibly displaced with respect to one another when connected.

7. The transducer assembly of claim 1, wherein the first transducer element and the second transducer element are detachably connectable to one another in at least two positions.

8. The transducer assembly of claim 1, wherein the angle is substantially 90 degrees.

9. The transducer assembly of claim 8, wherein the first row of ultrasonic transducers and the second row of ultrasonic transducers are arranged in a T-shape.

10. The transducer assembly of claim 1, wherein the first row of ultrasonic transducers or the second row of ultrasonic transducers is of the linear type.

11. The transducer assembly of claim 1, wherein the first row of ultrasonic transducers or the second row of ultrasonic transducers is of the convex type.

12. The transducer assembly of claim 1, wherein:
the first row of ultrasonic transducers is configured to transmit first ultrasonic rays into a body in a first direction and to receive a reflection of said first ultrasonic rays, and
the second row of ultrasonic transducers is configured to transmit second ultrasonic rays into the body in a second, different direction and to receive a reflection of said second ultrasonic rays.

13. The transducer assembly of claim 1, wherein the first transducer element and the second transducer element each comprise positioning elements configured to position the first transducer element and the second transducer element in various positions with respect to one another.

14. The transducer assembly of claim 1, further comprising a third transducer element comprising a third row of ultrasonic transducers, the third transducer element being configured to be detachably connectable to the first transducer element or to the second transducer element.

15. A transducer assembly, comprising:
a first transducer element comprising a first row of ultrasonic transducers;
a second transducer element comprising a second row of ultrasonic transducers; and
a connector in electrical communication with the first transducer element and the second transducer element, wherein:
the first transducer element and the second transducer element are detachably connected,
when the first transducer element and the second transducer element are detachably connected in a first position, the first row of ultrasonic transducers is arranged substantially in line with the second row of ultrasonic transducers, and
when the first transducer element and the second transducer element are detachably connected in a second position, the first row of ultrasonic transducers is arranged at an angle with respect to the second row of ultrasonic transducers.

16. The transducer assembly of claim 15, further comprising one or more cables electrically connecting the first transducer element and the second transducer element to the connector.

17. The transducer assembly of claim 15, wherein when the first transducer element and the second transducer element are detachably connected in the first position, the first row of ultrasonic transducers extends along the same longitudinal axis as the second row of ultrasonic transducers.

18. The transducer assembly of claim 15, further comprising a third transducer element comprising a third row of ultrasonic transducers, the third transducer element being configured to be detachably connectable to the first transducer element or to the second transducer element, wherein:

when the first transducer element, the second transducer element, and the third transducer element are detachably connected in a first position, the first row of ultrasonic transducers, the second row of ultrasonic transducers, and the third row of ultrasonic transducers are arranged substantially in line with one other, when the first row of ultrasonic transducers, the second row of ultrasonic transducers, and the third row of ultrasonic transducers are detachably connected in a second position, the first row of ultrasonic transducers, the second row of ultrasonic transducers, and the third row of ultrasonic transducers are arranged substantially in a T shape, when the first row of ultrasonic transducers, the second row of ultrasonic transducers, and the third row of ultrasonic transducers are detachably connected in a third position, the first row of ultrasonic transducers, the second row of ultrasonic transducers, and the third row of ultrasonic transducers are arranged substantially in an H shape.

19. The transducer assembly of claim 1, further comprising a connector in electrical communication with the first transducer element, the second transducer element, and an endoscope.

20. The transducer assembly of claim 15, wherein the connector is configured to be connected to an endoscope.

* * * * *